United States Patent [19]
Johnson

[11] 3,804,179
[45] Apr. 16, 1974

[54] CULTIVATOR SHIELD CONTROL MECHANISM

[76] Inventor: Gordon M. L. Johnson, Rural Rt. No. 1, Franklin, Minn. 55333

[22] Filed: May 5, 1972

[21] Appl. No.: 250,627

[52] U.S. Cl.................................. 172/510, 172/513
[51] Int. Cl............................................. A01b 17/00
[58] Field of Search.......................... 172/508–517, 172/534

[56] References Cited
UNITED STATES PATENTS

| | | | |
|---|---|---|---|
| 2,748,680 | 6/1956 | Aber | 172/485 |
| 1,258,492 | 3/1918 | Stansell | 172/510 |
| 1,819,899 | 8/1931 | Koebel | 172/509 |
| 2,682,215 | 6/1954 | Greenwood | 172/510 |
| 2,737,869 | 3/1956 | Yrkoski | 172/512 |
| 2,960,173 | 11/1960 | Stone | 172/534 |
| 3,214,894 | 11/1965 | Whitman | 172/517 X |
| 3,247,911 | 4/1966 | Erickson | 172/510 |
| 3,301,332 | 1/1967 | Burgin | 172/509 |
| 3,526,281 | 9/1970 | Meaden et al. | 172/510 |
| 3,708,019 | 1/1973 | Ryan | 172/484 X |

Primary Examiner—Robert E. Pulfrey
Assistant Examiner—Paul T. Sewell
Attorney, Agent, or Firm—Robert C. Baker

[57] ABSTRACT

Shield assemblies for row crop cultivators include a draw bar pivotally hinged at its forward end to a main mounting bar of the cultivator. A pair of cultivator shields are attached to the trailing end of said draw bar. The power-operated shield control mechanism includes a transverse control bar, powered means to effect rotary shifting of it, and a shield control linkage. The shield control linkage includes a radially-outward arm fixed to the control bar, plus a connecting rod extending between that arm and the draw bar of said shield assembly. The connecting rod is floatingly mounted to the radially-outward arm and flexibly hinged to the draw bar. Yieldable means permit the shields to be forcibly pressed into the soil. The power-operated control mechanism is effective both to forcibly press the shields into the soil and to elevate the shields plus the draw bar thereof to an out-of-the-way position.

5 Claims, 4 Drawing Figures

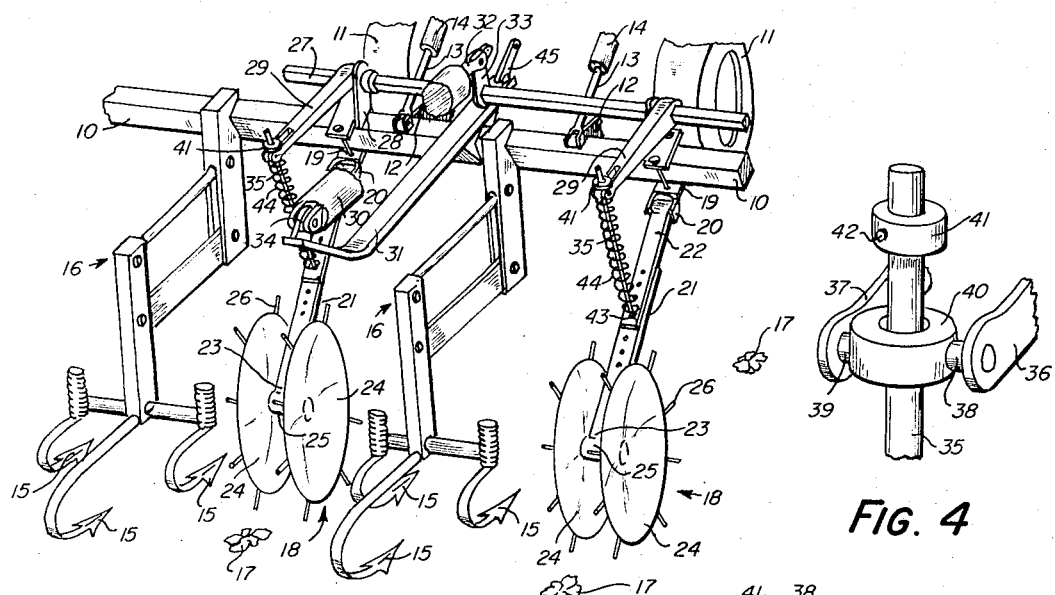
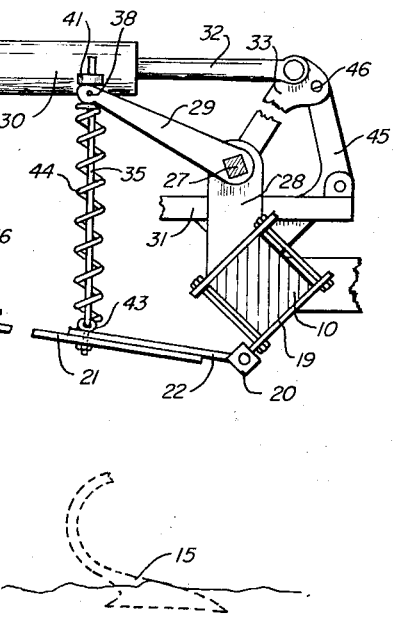
FIG. 4
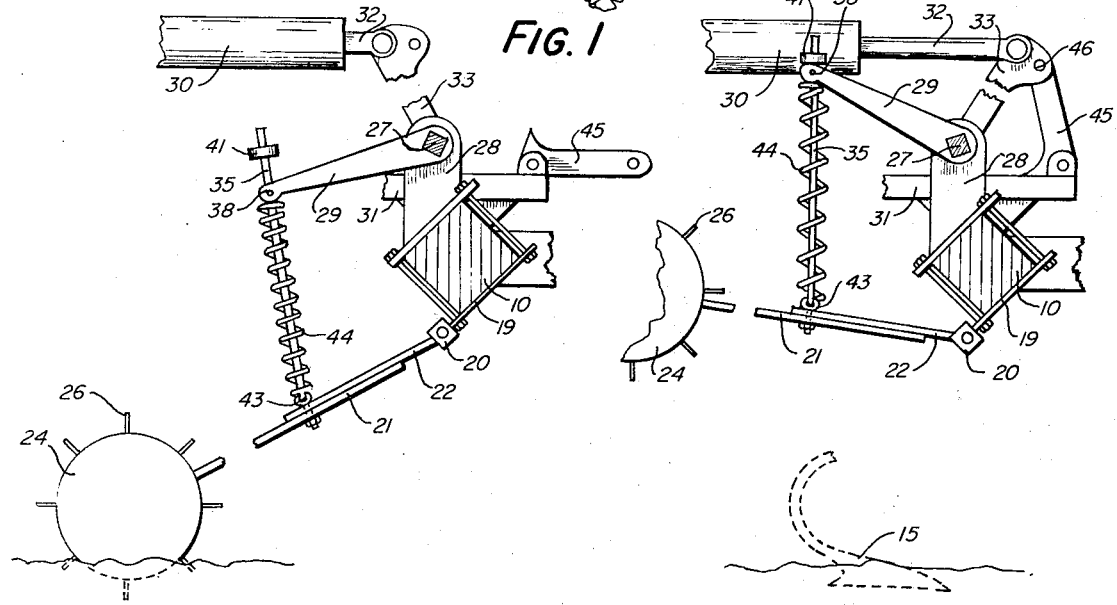
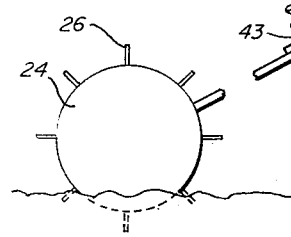
FIG. 1
FIG. 2
FIG. 3

CULTIVATOR SHIELD CONTROL MECHANISM

This invention relates to improvements in row crop cultivators, and more particularly, to an improved power-operated control mechanism for shield assemblies of row crop cultivators.

The new mounting and control mechanism taught herein for the shields of a row crop cultivator permits the cultivator to be used in the cultivation of row crops of various heights, without removal of the shields from the cultivator, whether or not the height of the crop requires use of the shields to shield the crop during cultivation. This is an especially important feature of the invention. Heretofore, it has been customary to remove the shields from row crop cultivators before cultivating relatively tall crops where shielding is unnecessary or undesired. Such removal has commonly been required because of the shield mounting arrangement customarily employed heretofore. The customary mounting arrangement for shields tends to cause damage to taller crops during the cultivation step unless the shields and the accompanying hardware for them on the cultivator are removed. Removal and re-attachment takes considerable time, called "down time," which could better be spent in active cultivation. Despite the fact that this problem has been recognized for years, no one insofar as is known has proposed a truly practical and economical solution to obviate the waste of that "down time" while retaining the benefit of immediate shielding capability for a gang cultivator.

The seriousness of the long-standing problem can quickly be recognized when one realizes that, from the stand-point of time alone, there is no reason why one should waste "down time" between the steps of actively cultivating (for example, at a time during the middle of the growing season) low crops such as soybeans or beets, where shielding is needed, and higher or taller crops such as corn, where shielding is not needed and would damage the crop if used. (At the beginning of the growing season, most row crops are so low as to require shielding during cultivation.) Sometimes, for a single row crop such as soybeans, part of the field may require shielding; and other parts may have grown so greatly as to be damaged by shielding. In short, several varied field conditions could be handled, from the cultivation standpoint, in a single day if it were not for the fact that much time is spent attaching and removing cultivator shields as required or not required for the field crop conditions.

The teaching hereof obviates the aforenoted "down time" problem, and does so by providing what in retrospect amounts to a relatively simple and economical arrangement of elements in a power-operated control mechanism. The control mechanism permits lowering of shields to the shielding position and elevating of the shields to an out-of-the-way non-shielding position. Thus, continuous operation of a cultivator from low growing crops to higher crops and back to lower crops is possible by practice of the invention.

An especially important feature of this apparatus is the simple shield draw bar. The draw bar employed is comparable to that popularly employed for cultivator shields on commercial cultivators at the present. The simplicity of this popular pivotally-attached draw bar (for pulling the cultivator shields along) has substantially displaced more cumbersome and expensive arrangements. However, the shield draw bar, in the practice of this invention, is mounted so that the pivot hinge at its leading end is in elevated condition relatively close, or in proximity to, a horizontal plane through the transverse mounting bar of the composite row crop cultivator, which is anything but comparable to present commercial practice.

Another important feature is that the control mechanism for the shields is adaptable to effect a special yieldable downward pressure upon the shields to forcibly and yet yieldingly press them into the soil to varying degrees as desired or required during cultivation.

An especially important feature is that the control mechanism is capable of effecting substantial elevation of the cultivator shields and associated elements of apparatus so as to permit tall crop cultivation without significant damage to the crop.

Other benefits and advantages of the invention will become apparent as this description proceeds.

The basic row crop cultivator or gang cultivator of the invention includes a mounting bar positioned transversely to the direction of travel of the cultivator during cultivation of a field. A plurality of cultivator shovels are operably connected to this mounting bar. The shovels are spaced for cultivating the soil on both sides of at least one plant row. Generally, a plurality of gangs of shovels are employed so as to permit cultivation of several rows on a single pass through the field. The cultivator is equipped with a shield assembly for each row capable of being cultivated by the cultivator. Each shield assembly includes several elements, the first of which is a bracket or other means fixed to the mounting bar for providing a pivot hinge at a location proximate to a horizontal plane through the mounting bar. A draw bar extends rearwardly from the pivot hinge. The leading end of the draw bar is fastened to the pivot hinge and its trailing end extends rearwardly therefrom. The pivot hinge is adapted to permit pivoting movement of the draw bar in a vertical plane. A pair of cultivator shields are operably attached to the trailing end of the draw bar; and these shields are adapted to be positioned to pass upon opposite sides of a plant row between the plants of the row and the pass of the cultivator shovels. The shield assembly is preferably adjustable, especially in terms of the length of the draw bar, so as to permit one to deflect varying but substantial amounts of soil from movement into the plant row as the cultivator shovels work the soil adjacent the row.

The improved power-operated control mechanism for the shield assemblies includes a transverse control bar mounted in substantially parallel relationship to the mounting bar. The control bar preferably is positioned above a horizontal plane through the mounting bar, and optionally may be mounted to lie somewhat rearwardly of the mounting bar. Preferably, the control bar is located in a relatively proximate relationship to the mounting bar, but this is not per se critical. Powered means, preferably hydraulic, is provided for effecting rotary shifting of the control bar. The rotary shifting desired is not that of a complete revolution of the control bar, but is in the nature of a rotary indexing or arcuate movement for the control bar. A shield control linkage for each shield assembly is controlled by the control bar. The shield control linkage consists essentially of a radially-outward arm fixed to the control bar for arcuate shifting in a vertical plane responsive to rotary shifting of the control bar. A connecting rod extends between this arm and the draw bar of the shield assembly. The connecting rod is floatingly mounted at the outer extremity of the arm so as to permit sliding movement of the arm along at least a portion of the connecting rod. A stop member is provided at the upper end portion of the connecting rod for keeping the arm on the connecting rod during upward shifting of the arm. The connecting rod is flexibly hinged to the draw bar intermediate the leading and trailing ends thereof. A special feature of this complete linkage is a yieldable means for applying downward pressure upon the shields of the shield assembly so as to forcibly press them into the soil. This yieldable means is actuated into pressure applying condition by rotary shifting of the control bar to effect sliding movement of the radially-outward arm downwardly along the connecting rod toward the draw bar. The control mechanism is effective not only to forcibly press the shields into the soil, but also to elevate the shields, plus the draw bar thereof, to a location at least approximately as high as a horizontal plane through the draw bar pivot hinge. These features in turn permit use of the cultivator for cultivating row crops of various height without removal of the shield assembly from the cultivator, whether or not the height of the crop requires use of shields to shield the crop during cultivation.

The invention will further be described with reference to a drawing, made a part hereof, wherein:

FIG. 1 is a schematic perspective view partially broken away, of a row crop cultivator being drawn behind a tractor;

FIG. 2 is a schematic side view, partially broken away, of one shield assembly of the cultivator with its accompanying linkage in a lowered position for shielding during cultivation, and with the shields of the shield assembly yieldingly pressed downwardly;

FIG. 3 is a schematic side view of one shield assembly of the cultivator with the shield and its accompanying control linkage in the elevated condition necessary for the cultivation of a tall crop not requiring shielding during cultivation; and FIG. 4 is a schematic perspective view illustrating one type of floating mounting of a connecting rod to an arm of the shield control linkage.

Referring to the drawing, the row crop cultivator comprises a mounting bar 10 which is positioned transversely to the direction of travel of a cultivator during cultivation of the field. Wheels 11 of a tractor (otherwise broken away for clarity) are shown to illustrate a motive power unit for drawing or pulling the gang cultivator through a field. The cultivator is attached or hooked to the tractor through suitable linkages such as, for example, tow brackets 12 and hydraulically controlled arms 13 which extend between the transverse mounting bar 10 and any suitable frame part of the tractor. Means such as hydraulic cylinders 14 may be included for adjusting or raising and lowering the height of the main mounting bar 10. Hydraulic lines, operator controls on the tractor, and many optional mechanisms as conventionally employed are omitted from the drawing.

A plurality of cultivator shovels 15 are operably connected to the mounting bar 10; and this connection is conventionally through a parallelogram linkage 16. A parallelogram linkage 16 permits elevation and lowering of the shovels at an operator's discretion (through various conventional control linkages not shown). Important to recognize is that the shovels 15 are spaced or grouped in gangs of usually two or more for cultivating the soil on both sides of at least one plant row 17. The type of cultivator shovels employed may vary widely, as is well understood in the art.

Shield assemblies 18 are mounted at intervals along the main mounting bar; and it is quite common to employ a sufficient number of groups of cultivator shovels and number of shield assemblies to cultivate at least four rows of plants in one pass through a field. Indeed, it is not uncommon to employ apparatus capable of cultivating as many as ten or more plant rows in one pass through a field.

Each shield assembly 18 includes a means such as a bracket member 19 fixed rigidly to the mounting bar 10 and providing a foundation for a pivot hinge 20 for the draw bar 21 of the shield assembly. The pivot hinge 20 is at a location proximate to a horizontal plane through the mounting bar 10. Indeed, the pivot hinge preferably is proximate to the draw bar in both a vertical and horizontal relationship. The important point, however, is that the draw bar pivot hinge 20 is located at a plane or level generally no lower than ½ foot below the mounting bar. Preferably the pivot hinge 20 is located rearwardly of at least the central axis portion of the mounting bar 10. Further, the mounting bar 10 preferably is located at least about 2 feet off the ground, but suitably is adjustable to a varying height, as aforenoted.

A draw bar 21, preferably adjustable in length (as, for example, made possible when overlapping strip segments bolted together are employed, as shown in the drawing) is attached with its leading end 22 to the pivot hinge 20 and with its trailing end 23 extending rearwardly therefrom. The pivot hinge 20 attachment is such that the draw bar 21 is easily pivoted in a vertical plane. A pair of cultivator shields 24 are attached in spaced relationship to the trailing end of the draw bar by any suitable means. Illustratively, the shields are attached to a shaft extending through a hub 25 at the end of the draw bar. Preferably, the shields 24 are disk-like in nature and rotate by rolling upon the ground as they are positioned to pass upon opposite sides of a plant row to deflect soil from movement into the plant row during cultivation. Finger-like projections or tines 26 suitably extend outwardly (in a generally radially outward direction, although optionally at angles to a straight radially outward direction) from the perimeter of the disk-like shields; and these tines penetrate the soil during cultivation and cause the disk-like shields to rotate as they are pulled along. This action tends to minimize the pulling of a mass of debris (such as corn stalks or the like) over a row of plants, which would cause damage to the row. The particular shield structure one employs is a matter of discretion; but at least it is preferably to employ disk-like shields as distinguished from mere plates or non-rotatable shields.

The power operator control mechanism for the shield assemblies includes, first of all, a transverse control bar 27 mounted (as by brackets 28 fixed rigidly to mounting bar 10) in substantially parallel relationship to the main beam or transverse mounting bar 10. Preferably control bar 27 is mounted above a horizontal plane through mounting bar 10; and in most cases, rod 27 will not be located forwardly of a vertical plane through the axis line for mounting bar 10. Control bar 27 suitably is rectangular in cross section, or at least non-circular in cross section. It optionally may be circular in substantial portions thereof, with splined areas or other non-circular portions for rigid mounting of arm members 29 on it. The arm members 29 extend radially-outward from it. The bracket members 28 hold the control bar 27 in a way permitting rotary shifting of it.

Powered means is provided for rotary shifting of the control bar 27. A hydraulically-operated cylinder 30 suitably is mounted on a bracket 31. Bracket 31 is rigidly fixed to the main mounting bar 10. An actuation rod 32 movable longitudinally in and out of the hydraulic cylinder 30 and actuated by it is suitably pivotally hinged to an arm 33, which is rigidly fixed to the control bar 27. Hydraulic cylinder 30 also is pivotally mounted at numeral 34 to bracket 31. Thus, as fluid is moved to and from hydraulic cylinder 30 (through conduits not shown in the drawing), rod 32 is extended or retracted to cause arm 33 to move in an arc and effect rotary shifting of control bar 27.

Each composite shield assembly is provided with a shield control linkage. The first part of this linkage is an arm 29 which extends radially-outward from the control bar 27 and is rigidly fixed to the control bar for arcuate shifting in a vertical plane responsive to the rotary shifting of the control bar 27. A connecting rod 35 extends between this arm 29 and the draw bar 21 of the shield assembly. The connecting rod 35 is floatingly mounted at the outer extremity of the arm 29 to permit sliding movement of the arm 29 along the connecting rod 35; and a suitable floating mounting is illustrated in FIG. 4. The arm 29 may be bifurcated, (as at numerals 36 and 37 in FIG. 4) at its terminal end and provided with bearing recesses or openings into which extend pivotable shaft extensions 38 and 39 from a slidable doughnut annulus 40 about the connecting rod. A stop member 41 is fixed to the upper extremity of the connecting rod; and this stop member 41 is suitably adjustable to permit it to be moved to different positions along the connecting rod 35. A set screw 42 or other means is provided to fix the stop member 41 to the connecting rod. Thus, the stop member 41 keeps the arm 29 (at its bifurcated end 36 and 37) on the connecting rod 35 during upward shifting of the arm 29; but the arm 29 may be slid downwardly from the stop member 41 along the connecting rod.

The lower end of the connecting rod 35 is flexibly hinged as at numeral 43 to the draw bar 21 at a location intermediate the leading and trailing ends of the draw bar 21. This flexible hinge 43 suitably may simply consist of two ring members interlocked, with one fixed to the draw bar 21 and the other to the lower terminus of the connecting rod 35. The ring member fixed to the draw bar 21 may include a threaded shaft extension from it and a cooperating nut for threading upon the threads thereof. A plurality of apertures or holes spaced along the length of the draw bar 21 permit varied location for the flexible hinged attachment of the connecting rod to the draw bar between the ends thereof.

A yieldable means 44 is provided for applying downward pressure upon the shields 24, that is upon the draw bar, so as to permit forcible pressing of the shields into the soil under varying degrees of pressure, as may be desired. In some instances little or no pressure forcing the shields into the soil is desired; and under such circumstances, the shields may be permitted to merely rest upon the soil and be drawn along during cultivation. But where a field is extremely trashy, or where extremely effective shield protection for the plant row is required, it is desirable to press the shields forcibly into the soil to a varying extent so as to gain positive shielding action as well as rotary action for rotatable shields so as to protect the plant row against damage.

The yieldable means suitably consists of a compressable coiled spring member 44 entrained about the connecting rod 35 between the floating mounting of that rod 35 to arm 29 off the control rod 27 and the draw bar 21 for the shields 24.

When the powered hydraulic means 30 is adjusted by the operator to draw the main control arm 33 fixed to the control rod 27 in a counterclockwise manner (as viewed in FIG. 2), the radially-extending arm 29 of the shield control linkage is moved downwardly in a counterclockwise manner. The initial counterclockwise movement merely rests shields 24 upon the soil; and if the pressure actuation of rod 32 of the hydraulic control system is relaxed, the shields will rest upon the soil under the weight of their linkages and roll along as they are drawn by the cultivator. Further hydraulically-actuated counterclockwise movement of the radially-extending arm 29 causes that arm 29 to slide along the connecting rod 35 to compress spring 44 entrained about it. The spring 44 in turn presses against the draw bar 21 and forces the shields into the soil, as illustrated in FIG. 2. But the pressure exerted is a yielding pressure. Thus, where the shields 24 encounter a corn stalk or rock or other element of trash on the field, the yieldability of the force pressing the shields 24 into the soil is such as to permit the shields 24 to rise up and roll over the object.

In FIG. 3, the control rod 27 is shown indexed or rotated toward a clockwise position, which draws the radially-outward arms 29 of the shield control linkage in an upward elevated condition. This in turn elevates the connecting rod 35 and elevates the draw bar 21 of the shield assembly by pivoting the draw bar upwardly from its pivot hinge 20. Suitably, a lock link 45 hinged to an extension of bracket 31 on the main mounting bar 10 is tilted upwardly and pinned as by pin 46 to the control arm 33 of the control bar 27 to mechanically hold the control bar 27 against movement during the time one desires the shields 24 to be elevated upwardly completely out-of-the-way for cultivating a relatively tall crop not requiring shielding.

Thus, the improved cultivator as taught herein, while extraordinarily simple, includes a shield control mechanism which is entirely effective both to forcibly press the shields into the soil as well as to elevate or pivot the shields plus the draw bar thereof at least as high a horizontal plane through the draw bar pivot hinge. To be recognized is that the connection of the connecting rod 35 to the draw bar 21 is always spaced aft of the draw bar pivot hinge 20 and forward of the hub assembly or shield attachment to the draw bar 21. In general, the attachment of a connecting rod to the draw bar is within the segment of the draw bar identified as the middle one-half, or even the middle one-third, portion thereof. This feature permits magnification of the arcing movement for the shields to the out-of-the-way elevated position, while at the same time permitting a relatively smaller arcing movement for the radially-outward arms 29 to effect that result, thereby permitting the arms 29 to be relatively short to reduce the total bulk and weight of the linkage. Furthermore, the intermediate attachment of the connecting rod 35 to the draw bar 21 enhances the yieldability feature for the shields when under downward pressure such as illustrated in FIG. 2. The length of the draw bar aft the point of connection of the connecting rod 35 to it is sufficient, in combination with the preferred flat strip character of it, to exhibit a modicum of yieldability itself in that portion.

As illustrated in FIG. 2, the preferred arrangement of elements is such that the draw bar 21 slopes downwardly from its pivot hinge 20 during shielding use in cultivation. Further, the lines of force along draw bar 21 and the bracket attachment 19 for the pivot hinge 20 are preferably more or less in alignment (as distinguished from a bracket member 19 extending straight downwardly from main beam 10 with draw bar 21 more or less horizontally extending rearwardly therefrom, as is common in current commercial practice).

An alternate floating mounting between connecting rod 35 and arm 29 is conveniently and economically accomplished by forming arm 29 with an elongated slot in its radially outward end, with connecting rod 35 extending through the slot. Stop member 41 is of sufficient bulk to be abutted against by the sides of the elongated slot when arm 29 is elevated.

The most important point is that the improved shield linkage taught herein obviates the long-standing vexing "down time" problem caused by the need to attach and remove shields to and from cultivators as they are needed and not needed; and this advantageous result, together with a capability of applying yieldable downward pressure on shields, is accomplished without a cumbersome and expensive apparatus arrangement and with surprising economy, particularly when it is recognized that the vexing problem has for years been tolerated without any apparent solution being heretofore evident.

That which is claimed is:

1. A row crop cultivator comprising a mounting bar positioned transversely to the direction of travel of the cultivator during cultivation of a field, a plurality of cultivator shovels operably connected to said mounting bar, said shovels being spaced for cultivating the soil on both sides of at least one plant row, at least one shield assembly, said shield assembly including (i) means fixed to said mounting bar for providing a pivot hinge at a location proximate to a horizontal plane through said mounting bar, (ii) a draw bar having its leading end fastened to said pivot hinge and its trailing end extending rearwardly therefrom, said pivot hinge being adapted to permit pivoting movement of said draw bar in a vertical plane, and (iii) a pair of cultivator shields operably attached to the trailing end of said draw bar, said shields being adated to be positioned to pass upon opposite sides of a plant row between the plants of said row and the path of said cultivator shovels, and a power-operated control mechanism for said shield assembly, said power-operated control mechanism including (i) a transverse control bar mounted in substantially parallel relationship to said mounting bar, (ii) powered means to effect rotary shifting of said control bar, and (iii) at least one shield control linkage consisting essentially of (a) a radially-outward arm fixed to said control bar for arcuate shifting in a vertical plane responsive to rotary shifting of said control bar, (b) a connecting rod between said arm and said draw bar of said shield assembly, said connecting rod being floatingly mounted at the outer extremity of said arm to permit sliding movement of said arm along said connecting rod and being flexibly hinged to said draw bar intermediate the leading and trailing ends thereof, (c) a stop member for keeping said arm on said connecting rod during upward shifting of said arm, and (d) yieldable means for applying downward pressure upon said shields to forcibly press said shields into the soil, said yieldable means comprising a compressible coiled spring member about said connecting rod between said arm and said draw bar, said yieldable means being actuated into said pressure applying condition by rotary shifting of said control bar to effect downward sliding movement of said arm along said connecting rod for varying degree of compression of said coiled spring member toward said draw bar, said power-operated control mechanism being effective both to forcibly and yieldingly press said shields to a varying degree into the soil and to elevate said shields plus the draw bar thereof at least as high as the horizontal plane through said draw bar pivot hinge, thereby permitting use of said cultivator for cultivating row crops of varied height, without removal of said shield assembly from the cultivator, with or without use of said shields for shielding during said cultivation.

2. In the cultivator of claim 1, the feature of said draw bar pivot hinge being located at a height no lower than one-half foot below said mounting bar.

3. In the cultivator of claim 1, the feature of said shields of said shield assembly being disk shields adapted to rotate when pressed into the soil for shielding a row crop.

4. In the cultivator of claim 1, the feature of said powered means being hydraulic.

5. In the cultivator of claim 1, the feature of said control bar being non-circular in cross-section.

* * * * *